(12) United States Patent
Ma et al.

(10) Patent No.: US 12,313,746 B2
(45) Date of Patent: May 27, 2025

(54) METHOD, APPARATUS FOR SUPERIMPOSING LASER POINT CLOUDS AND HIGH-PRECISION MAP AND ELECTRONIC DEVICE

(71) Applicant: Apollo Intelligent Connectivity (Beijing) Technology Co., Ltd., Beijing (CN)

(72) Inventors: Wei Ma, Beijing (CN); Ji Tao, Beijing (CN); Xing Hu, Beijing (CN); Liqi Wang, Beijing (CN); Kun Wang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 844 days.

(21) Appl. No.: 17/511,880

(22) Filed: Oct. 27, 2021

(65) Prior Publication Data

US 2022/0050210 A1     Feb. 17, 2022

(30) Foreign Application Priority Data

Mar. 18, 2021   (CN) .......................... 202110289938.X (51) Int. Cl.
   *G06T 7/521*   (2017.01)
   *G01S 7/48*    (2006.01)
   (Continued)

(52) U.S. Cl.
   CPC .......... *G01S 17/931* (2020.01); *G01S 7/4808* (2013.01); *G01S 17/89* (2013.01); *G06T 7/521* (2017.01);
   (Continued)

(58) Field of Classification Search
   None
   See application file for complete search history.

(56) References Cited

U.S. PATENT DOCUMENTS 11,763,478 B1 *  9/2023  Yang .......................... G06T 7/12
2014/0267279 A1  9/2014  Kontkanen
(Continued)

FOREIGN PATENT DOCUMENTS

| CN | 107704879 A | 2/2018 |
| CN | 107944018 A | 4/2018 |

(Continued)

OTHER PUBLICATIONS

Zhao Saishuai, "Exploration on the Construction Method of Ningbo Digital Highway High-precision Map", Geospatial Information, Sep. 2020, vol. 18, No. 9, 7 pages.

(Continued)

*Primary Examiner* — Ian L Lemieux
(74) *Attorney, Agent, or Firm* — Tucker Ellis LLP (57) ABSTRACT

The present application discloses a method, an apparatus for superimposing laser point clouds and a high-precision map and an electronic device, comprising: when superimposing the laser point clouds and the high-precision map for visualization, first performing dilution processing on non-road laser point clouds in the laser point clouds to be fused to obtain target non-road laser point clouds, which effectively reduces the amount of data of the laser point clouds to be fused; and performing segmentation processing on the map to be fused to obtain multi-level map data corresponding to the map to be fused, which effectively reduces the amount of data of the map to be fused. In this way, when superimposing the laser point clouds and the high-precision map for visualization, both non-road information may be visualized through the laser point clouds, and road information may be visualized through the high-precision map.

17 Claims, 4 Drawing Sheets

(51) Int. Cl.
*G01S 17/89* (2020.01)
*G01S 17/931* (2020.01)
*G06V 10/26* (2022.01)
*G06V 20/64* (2022.01)

(52) U.S. Cl.
CPC .... *G06V 10/26* (2022.01); *G06T 2207/10028* (2013.01); *G06V 20/64* (2022.01)

(56) References Cited

U.S. PATENT DOCUMENTS

| | | | | |
|---|---|---|---|---|
| 2015/0178977 | A1* | 6/2015 | Kontkanen | G06T 17/05 345/419 |
| 2020/0025935 | A1* | 1/2020 | Liang | G06V 20/64 |
| 2020/0184718 | A1 | 6/2020 | Chiu et al. | |
| 2020/0401816 | A1 | 12/2020 | Schroeter | |
| 2021/0063200 | A1* | 3/2021 | Kroepfl | C03C 17/3644 |
| 2021/0105494 | A1* | 4/2021 | Sugio | H04N 19/182 |
| 2021/0341940 | A1* | 11/2021 | Baik | G01C 21/3896 |
| 2021/0404814 | A1* | 12/2021 | Hess | G01C 21/32 |
| 2021/0405200 | A1* | 12/2021 | Ding | G06T 17/05 |
| 2022/0032452 | A1* | 2/2022 | Casas | G06V 10/82 |
| 2022/0113159 | A1* | 4/2022 | Hou | G01C 21/3461 |
| 2022/0214457 | A1* | 7/2022 | Liang | G06N 3/04 |

FOREIGN PATENT DOCUMENTS

| | | |
|---|---|---|
| CN | 108334523 A | 7/2018 |
| CN | 109064506 A | 12/2018 |
| CN | 110163065 A | 8/2019 |
| CN | 111105496 A | 5/2020 |
| CN | 111127530 A | 5/2020 |
| CN | 111462029 A | 7/2020 |
| CN | 111462072 A | 7/2020 |
| CN | 112082565 A | 12/2020 |
| CN | 112184603 A | 1/2021 |
| JP | 2020-112876 A | 7/2020 |
| WO | 2019/037484 A1 | 2/2019 |

OTHER PUBLICATIONS

Notice of Reasons for Refusal of corresponding Japanese Patent Application No. 2021-179134, dated Aug. 29, 2022, 7 pages.

The Second Office Action of corresponding Chinese Patent Application No. 202110289938X, dated Jul. 21, 2022, 10 pages.

Notification of Grant Patent Right for Invention of corresponding Chinese Application No. 202110289938.X, dated Nov. 1, 2022, 6 pages.

European Search Report of corresponding European application No. 21204946.4, dated May 10, 2022, 9 pages.

Office Action of corresponding Chinese application No. 202110289938. X, dated Apr. 26, 2022, 10 pages.

Translation of Office Action of corresponding Chinese application No. 202110289938.X, dated Apr. 26, 2022, 2 pages.

Li et al., "A Review of Point Cloud Compression", ZTE Technology Journal, vol. 27 No. 1, Feb. 2021, 5 pages.

Yang et al., "Research on the Key Technologies of High Precision Navigation Map Based on Laser Point Cloud Scanning", Mar. 2018, 4 pages.

Rusu et al., "Towards 3D Point Cloud Based Object Maps for Household Environments", Mar. 2, 2010, 29 pages.

Xiang et al., "A Novel Octree-Based 3-D Fully Convolutional Neural Network for Point Cloud Classification in Road Environment", IEEE Transactions on Geoscience and Remote Sensing, vol. 57, No. 10, Oct. 2019, 20 pages.

* cited by examiner

METHOD, APPARATUS FOR SUPERIMPOSING LASER POINT CLOUDS AND HIGH-PRECISION MAP AND ELECTRONIC DEVICE

CROSS-REFERENCE TO RELATED APPLICATION

This application claims priority to Chinese Patent Application No. 202110289938X, filed on Mar. 18, 2021, the disclosure of which is hereby incorporated by reference in its entirety.

TECHNICAL FIELD

The present application relates to the field of data processing technology, in particular to a method, an apparatus for superimposing a laser point clouds and a high-precision map and an electronic device, which can be specifically used in the fields of artificial intelligence technology, autonomous driving technology, intelligent transportation technology, and computer vision technology.

BACKGROUND

When performing digital city visualization, a high-precision map can solve road informatization problems well, and a laser point clouds can well reflect non-road information, such as information like poles, boards, traffic lights, as well as roadside information, such as information like vegetation, buildings; therefore, in order to achieve digital city visualization, it may be considered that the laser point clouds and the high-precision map may be combined to better present road and roadside information, so that the effect of digital urbanization can be well presented.

However, when the laser point clouds and the high-precision map are combined to present the effect of digital urbanization, since both the high-precision map and the laser point clouds have relatively large data amounts, if the laser point clouds and the high-precision map are directly superimposed and a superposition result is visualized, then it will result in a large amount of visualized data, resulting in poor display effect of digital urbanization.

SUMMARY

The present application provides a method, an apparatus for superimposing laser point clouds and a high-precision map and an electronic device. When superimposing the laser point clouds and the high-precision map for visualization, the amount of visualized data is reduced, thereby improving the display effect of digital urbanization.

According to a first aspect of the present application, a method for superimposing laser point clouds and a high-precision map is provided, and the method for superimposing the laser point clouds and the high-precision map may include:
  acquiring laser point clouds to be fused and a map to be fused respectively, where the map to be fused at least includes a partial high-precision map;
  performing dilution processing on non-road laser point clouds in the laser point clouds to be fused to obtain target non-road laser point clouds;
  performing segmentation processing on the map to be fused to obtain multi-level map data corresponding to the map to be fused; and
  performing superposition processing on the target non-road laser point clouds and the multi-level map data, and visualizing a superposition result.

According to a second aspect of the present application, an apparatus for superimposing laser point clouds and a high-precision map is provided. The apparatus for superimposing the laser point clouds and the high-precision map may include:
  an acquiring unit, configured to acquire laser point clouds to be fused and a map to be fused respectively, where the map to be fused at least includes a partial high-precision map;
  a processing unit, configured to perform dilution processing on non-road laser point clouds in the laser point clouds to be fused to obtain target non-road laser point clouds, and perform segmentation processing on the map to be fused to obtain multi-level map data corresponding to the map to be fused;
  a superimposing unit, configured to perform superposition processing on the target non-road laser point clouds and the multi-level map data; and
  a displaying unit, configured to visualize a superposition result.

According to a third aspect of the present application, an electronic device is provided, including:
  at least one processor; and
  a memory, communicatively connected with the at least one processor; where,
  the memory stores instructions executable by the at least one processor, and the instructions are executed by the at least one processor, to enable the at least one processor to execute the method for superimposing the laser point clouds and the high-precision map according to the first aspect.

According to a fourth aspect of the present application, a non-transitory computer-readable storage medium storing computer instructions is provided, where the computer instructions are used to cause a computer to execute the method for superimposing the laser point clouds and the high-precision map according to the first aspect.

According to a fifth aspect of the present application, a computer program product is provided, the computer program product includes: a computer program, the computer program is stored in a readable storage medium, and at least one processor of an electronic device may read the computer program from the readable storage medium, and the at least one processor executes the computer program to cause the electronic device to execute the method for superimposing the laser point clouds and the high-precision map according to the first aspect above.

According to the technical solutions of the present application, when superimposing the laser point clouds and the high-precision map for visualization, the dilution processing is first performed on the non-road laser point clouds in the laser point clouds to be fused to obtain the target non-road laser point clouds, which effectively reduces the amount of data of the laser point clouds to be fused; and the segmentation processing is performed on the map to be fused to obtain the multi-level map data corresponding to the map to be fused, which effectively reduces the amount of data of the map to be fused. In this way, when superimposing the laser point clouds and the high-precision map for visualization, both non-road information may be visualized through the laser point clouds, and road information may be visualized through the high-precision map, not only digital city visualization is realized, but also the amount of visualized data is effectively reduced, and the display effect of digital urbanization is improved.

It should be understood that the content described in this section is not intended to identify key or important features of embodiments of the present application, nor is it intended to limit the scope of the present application. Other features of the present application will be easily understood through the following description.

BRIEF DESCRIPTION OF DRAWINGS

The attached drawings are used for a better understanding of the solutions, and do not constitute a limitation of the present application. Among them.

DESCRIPTION OF EMBODIMENTS

Exemplary embodiments of the present application will be illustrated in combination with the accompanying drawings in the following, where various details of embodiments of the present application are included to facilitate understanding, and they should be considered as merely exemplary. Therefore, those of ordinary skill in the art should recognize that various changes and modifications can be made to the embodiments described herein without departing from the scope and spirit of the present application. Also, for clarity and conciseness, description of well-known functions and structures are omitted in the following description.

In the embodiments of the present application, "at least one" refers to one or more, and "multiple" refers to two or more. "And/or" describes an association relationship of associated objects, which means that there may be three relationships. For example, A and/or B may mean three situations: A exists alone, A and B exist at the same time, and B exists alone, where A and B can be singular or plural. In the text description of the present application, the character "/" generally indicates that the associated objects before and after are in an "or" relationship.

The technical solutions provided by the embodiments of the present application may be applied to scenarios of digital city visualization, and specifically may be applied to scenarios of superposing and fusing laser point clouds and high-precision maps. When performing digital city visualization, it may be considered that the laser point clouds and the high-precision map may be combined to better present road and roadside information, so that the effect of digital urbanization can be well presented. However, when the laser point clouds and the high-precision map are combined to present the effect of digital urbanization, since both the high-precision map and the laser point clouds have relatively large data amounts, if the laser point clouds and the high-precision map with relatively large data amounts are directly superimposed and a superposition result is visualized, then it will result in a large amount of visualized data, resulting in poor display effect of digital urbanization.

In order to reduce the amount of visualized data and improve the display effect of digital urbanization, it may be considered that before superimposing laser point clouds and a high-precision map, dilution processing may be performed on laser point clouds to be fused to reduce the amount of data of the laser point clouds to be fused, and, in order to perform a targeted hierarchical display, segmentation processing may also be performed on the high-precision map to be fused to reduce the amount of data of the high-precision map to be fused; later, superposition processing is performed on the laser point clouds after processing and multi-level map data obtained by the segmentation processing, and a superposition result is visualized. In this way, when superimposing the laser point clouds and the high-precision map for visualization, the amount of visualized data can be effectively reduced, thereby improving the display effect of digital urbanization.

Based on the above technical concept, an embodiment of the present application provides a method for superimposing laser point clouds and a high-precision map. First, laser point clouds to be fused and a map to be fused are acquired respectively, where the map to be fused at least includes a partial high-precision map; and dilution processing is performed on non-road laser point clouds in the laser point clouds to be fused to obtain target non-road laser point clouds; segmentation processing is performed on the map to be fused to obtain multi-level map data corresponding to the map to be fused; superposition processing is then performed on the target non-road laser point clouds and the multi-level map data, and a superposition result is visualized.

Among them, the map to be fused at least including a partial high-precision map covers two situations, one is: the map to be fused is only a high-precision map; the other is: the map to be fused is formed by fusing a standard precision map and a high-precision map, which may be set according to actual needs. The precision of the high-precision map is higher than that of the standard-precision map, and the amount of data of the high-precision map is much larger than that of the standard-precision map.

Among them, the non-road laser point clouds may be understood as the laser point clouds being used to describe non-road information, such as information like vegetation, buildings; and road laser point clouds may be understood as the laser point clouds being used to describe road information.

It can be seen that in the embodiments of the present application, when superimposing the laser point clouds and the high-precision map for visualization, the dilution processing is first performed on the non-road laser point clouds in the laser point clouds to be fused to obtain the target non-road laser point clouds, which effectively reduces the amount of data of the laser point clouds to be fused; and the segmentation processing is performed on the map to be fused to obtain the multi-level map data corresponding to the map to be fused, which effectively reduces the amount of data of the map to be fused. In this way, when superimposing the laser point clouds and the high-precision map for visualization, both non-road information may be visualized through the laser point clouds, and road information may be visualized through the high-precision map. Not only the digital city visualization is realized, but also the amount of visualized data is effectively reduced, and the display effect of digital urbanization is improved.

Hereinafter, the method for superimposing the laser point clouds and the high-precision map provided by the present application will be described in detail through specific embodiments. It is understandable that the following specific embodiments may be combined with each other, and the same or similar concepts or processes may not be repeated in some embodiments.

Embodiment 1

Figure 1:
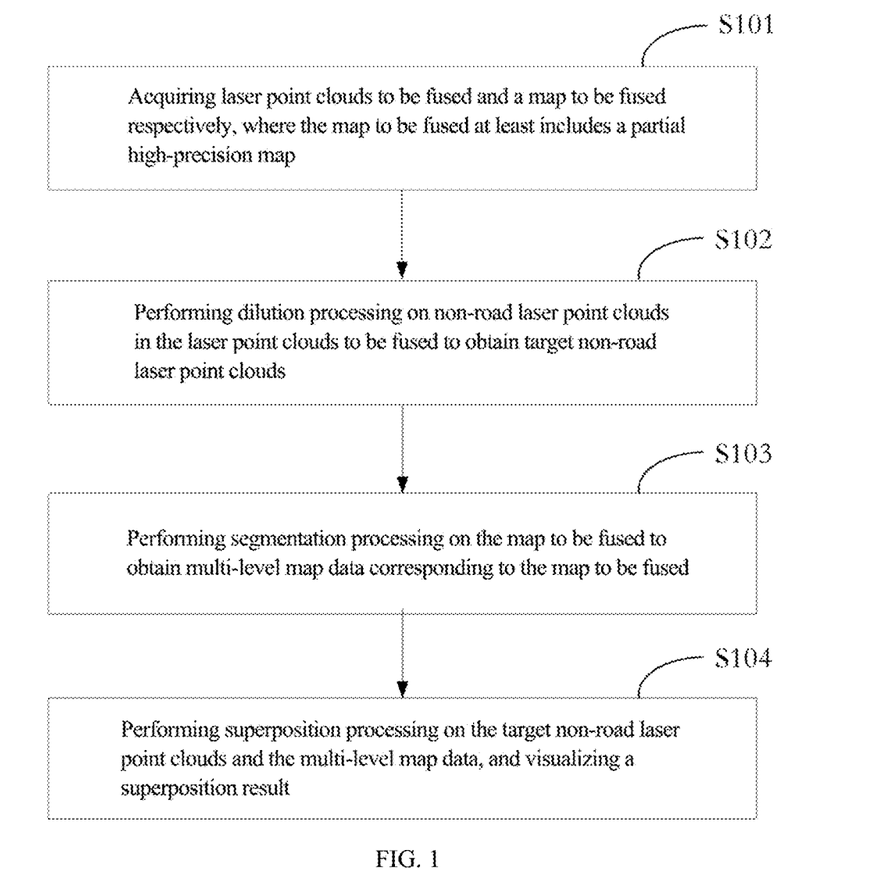
FIG. 1 is a schematic flowchart of a method for superimposing laser point clouds and a high-precision map according to a first embodiment of the present application.

FIG. 1 is a schematic flowchart of a method for superimposing laser point clouds and a high-precision map according to a first embodiment of the present application. The method for superimposing the laser point clouds and the high-precision map may be executed by a software and/or hardware apparatus. For example, the hardware apparatus may be a terminal or a server. Exemplary, please refer to FIG. 1, the method for superimposing the laser point clouds and the high-precision map may include:

S101, acquiring laser point clouds to be fused and a map to be fused respectively, where the map to be fused at least includes a partial high-precision map.

Among them, the map to be fused at least including a partial high-precision map covers two situations, one is: the map to be fused is only a high-precision map; the other is: the map to be fused is formed by fusing a standard precision map and a high-precision map, which may be set according to actual needs.

Combining the two situations covered by the map to be fused, in this embodiment of the present application, when acquiring the map to be fused, in a possible implementation manner, if the map to be fused is only the high-precision map, since the high-precision map itself already has a high precision, the high-precision map may be directly used as the map to be fused without performing an optimizing processing on the precision of the high-precision map; in another possible implementation, if the map to be fused is formed by fusing the standard precision map and the high-precision map, before fusing the standard-precision map and the high-precision map, optimizing processing needs to be first performed on the precision of the standard-precision map to improve the precision of the standard-precision map; then the map after the optimizing processing and the high-precision map are fused to obtain the map to be fused. In this way, by optimizing the precision of the standard-precision map, the advantage is that it can solve a ground object deviation phenomenon occurring when superimposing with the laser point clouds in the later stage due to the inaccurate precision of the standard-precision map, thereby improving the precision of the superposition result.

Exemplary, when acquiring the laser point clouds to be fused, initial laser point clouds may be acquired first. If the precision of the initial laser point clouds is high, the initial laser point clouds may be directly determined as the laser point clouds to be fused; if the precision of the initial laser point clouds is not accurate, optimizing processing may be first performed on the precision of the initial laser point clouds, and the laser point clouds obtained by the optimizing processing are determined as the laser point clouds to be fused; among them, the precision of the laser point clouds to be fused is higher than that of the initial laser point clouds, and the precision of the laser point clouds after the optimizing processing is centimeter-level precision. In this way, by optimizing the precision of the laser point clouds with inaccurate precision, the advantage is that it can solve the ground object deviation phenomenon occurring when superimposing with the map to be fused in the later stage due to the inaccurate precision of the laser point clouds, thereby improving the precision of the superposition result.

After acquiring the laser point clouds to be fused and the map to be fused respectively, in order to effectively reducing the amount of visualized data when superimposing the laser point clouds and the high-precision map for visualization, dilution processing on non-road laser point clouds in the laser point clouds to be fused and segmentation processing on the map to be fused are first performed before superimposing the laser point clouds and the high-precision map for visualization, that is, the following S102 and S103 are respectively executed:

S102, performing the dilution processing on the non-road laser point clouds in the laser point clouds to be fused to obtain target non-road laser point clouds.

When performing the dilution processing on the non-road laser point clouds in the laser point clouds to be fused, in a possible implementation, the dilution processing may be directly performed on the non-road laser point clouds in the laser point clouds to be fused to effectively reduce the amount of data of the laser point clouds to be fused when superimposing the laser point clouds and the high-precision map for visualization; however, since the laser point clouds to be fused may include a lot of noisy noise, in order to reduce the influence of the noise on the laser point clouds to be fused, in another possible implementation, denoising processing may be first performed on the laser point clouds to be fused, and then the dilution processing is performed on the non-road laser point clouds in the laser point clouds to be fused after the denoising processing, thus the influence of the noise on the laser point clouds to be fused may be reduced in the case that the amount of data of the laser point clouds to be fused is effectively reduced.

S103. performing the segmentation processing on the map to be fused to obtain multi-level map data corresponding to the map to be fused.

Exemplary, when performing segmentation processing on the map to be fused, according to a degree of importance of each element included in the map to be fused, for example, roads may be divided into highways, national highways, provincial highways, county highways, township highways, and the like, for example, rivers may be divided into one-level rivers, two-level rivers, three-level rivers and the like, the segmentation processing is performed on the map to be fused in the light of the degree of importance to obtain the multi-level map data. In this way, when superimposing the laser point clouds and the high-precision map for visualization, not only the amount of data of the map to be fused may be effectively reduced, but also map data of different levels may be displayed to a user in a targeted manner, which is convenient for the user to view, thereby improving user experience.

It can be understood that, in the embodiment of the present application, there is no sequence order between S102 and S103. S102 may be executed first, and then S103 is executed; S103 may be executed first, and then S102 is executed; S102 and S103 may also be executed synchronously, which may specifically be set according to actual needs. Here, the embodiment of the present application only takes that S102 is executed first, and then S103 is executed as an example for illustration, but it does not mean that the embodiment of the present application is limited to this.

After respectively acquiring the target non-road laser point clouds and the multi-level map data after processing, superimposing processing is performed on the target non-road laser point clouds and the multi-level map data, and a superposition result is visualized, that is, the following S104 is executed:

S104, performing the superposition processing on the target non-road laser point clouds and the multi-level map data, and visualizing the superposition result.

Figure 2:
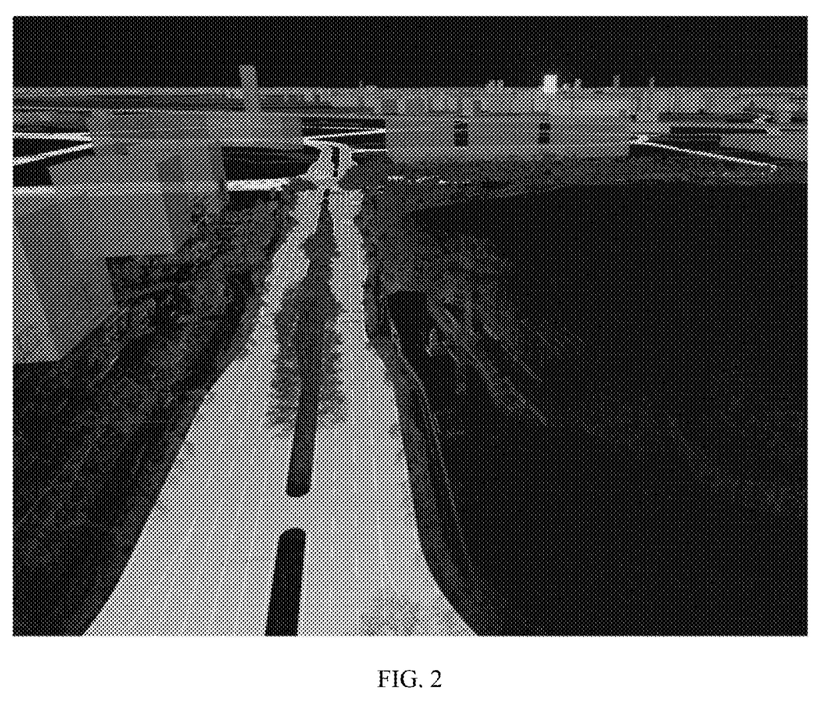
FIG. 2 is a schematic diagram of superimposing laser point clouds and a high-precision map for visualization according to an embodiment of the present application.
Figure 3:
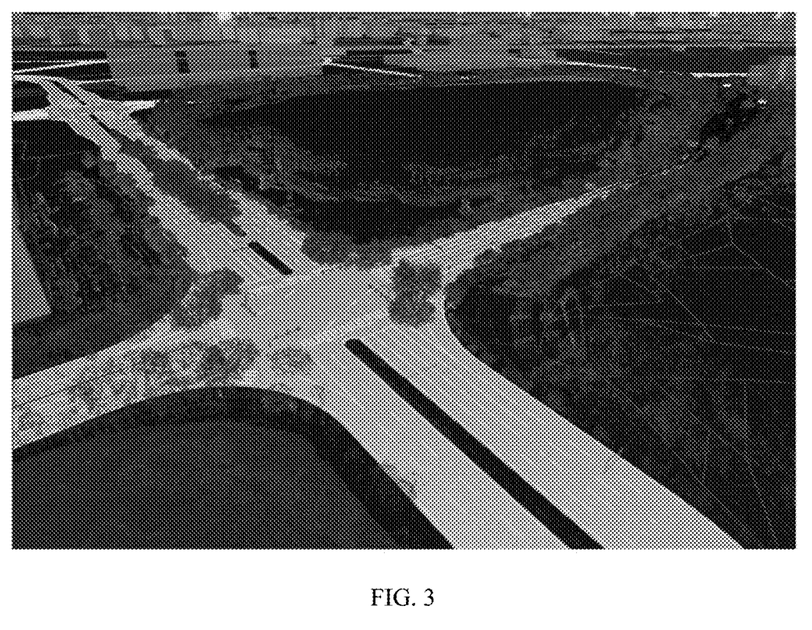
FIG. 3 is another schematic diagram of superimposing laser point clouds and a high-precision map for visualization according to an embodiment of the present application.

Exemplary, please refer to FIG. 2 and FIG. 3. FIG. 2 is a schematic diagram of superimposing laser point clouds and a high-precision map for visualization according to an embodiment of the present application, and FIG. 3 is another schematic diagram of superimposing laser point clouds and a high-precision map for visualization according to an example of the present application. It can be seen from FIG. 2 and FIG. 3 that by superimposing the laser point clouds and the high-precision map, road and non-road information may be better presented, which not only realizes digital city visualization, but also effectively reduces the amount of visualized data, and improving the display effect of digital urbanization.

It can be seen that in the embodiment of the present application, when superimposing the laser point clouds and the high-precision map for visualization, dilution processing is first performed on the non-road laser point clouds in the laser point clouds to be fused to obtain the target non-road laser point clouds, which effectively reduces the amount of data of the laser point clouds to be fused; and segmentation processing is then performed on the map to be fused to obtain the multi-level map data corresponding to the map to be fused, which effectively reduces the amount of data of the map to be fused. In this way, when superimposing the laser point clouds and the high-precision map for visualization, both the non-road information may be visualized through the laser point clouds, and the road information may be visualized through the high-precision map, which not only digital city visualization is realized, but also the amount of visualized data is effectively reduced, and the display effect of digital urbanization is improved.

Based on the above embodiment shown in FIG. 1, in the above S102, before performing dilution processing on the non-road laser point clouds in the laser point clouds to be fused, the non-road laser point clouds may be acquired from the laser point clouds to be fused. Hereinafter, the following embodiment 2 shown in FIG. 4 will be used to describe in detail how to acquire the non-road laser point clouds from the laser point clouds to be fused in an embodiment of the present application.

Embodiment 2

Figure 4:
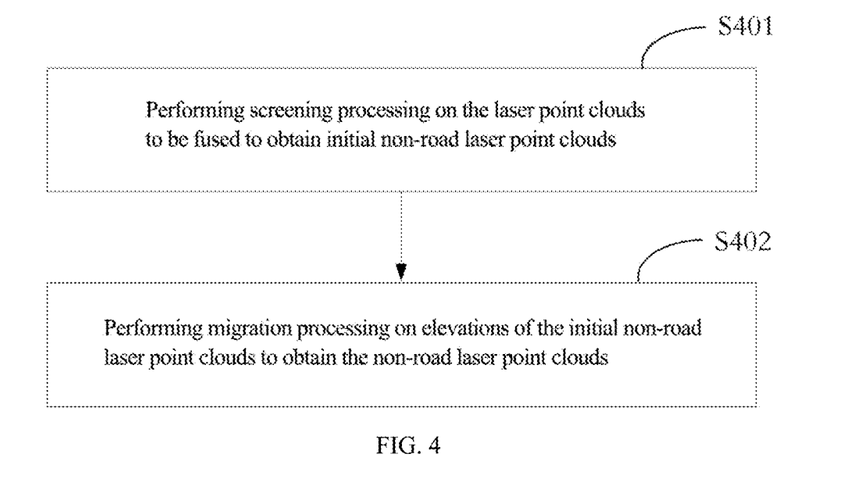
FIG. 4 is a schematic flowchart of a method for acquiring non-road laser point clouds according to a second embodiment of the present application.

FIG. 4 is a schematic flowchart of a method for acquiring non-road laser point clouds according to a second embodiment of the present application. The method for acquiring the non-road laser point clouds may also be executed by a software and/or hardware apparatus. For example, the hardware apparatus may be a terminal or a server. Exemplary, please refer to FIG. 4. The method for acquiring the non-road laser point clouds may include:

S401, performing screening processing on the laser point clouds to be fused to obtain initial non-road laser point clouds.

Exemplary, the laser point clouds to be fused may only include the initial non-road laser point clouds, or may include the initial non-road laser point clouds and initial road laser point clouds, which may be specifically set according to actual needs.

By performing the screening processing on the laser point clouds to be fused, the initial non-road laser point clouds may be obtained from the laser point clouds to be fused. After acquiring the initial non-road laser point clouds, migration processing may be performed on elevations of the initial non-road laser point clouds, that is, the following S402 is executed, and non-road laser point clouds obtained by the migration processing are the non-road laser point clouds shown in S102 above.

S402. performing migration processing on the elevations of the initial non-road laser point clouds to obtain the non-road laser point clouds.

Exemplary, in the embodiment of the present application, when performing migration processing on the elevations of the initial non-road laser point clouds, combining that the content included in the laser point clouds to be fused is different, therefore, the migration processing may be performed on the elevations of the initial non-road laser point clouds through the following at least two possible implementations method.

In a possible implementation, if the laser point clouds to be fused includes not only initial non-road laser point clouds, but also the initial road laser point clouds, then an average road elevation corresponding to single frame data in the laser point clouds to be fused may be first calculated and determined when performing migration processing on the elevations of the initial non-road laser point clouds, where the single frame data includes the initial non-road laser point clouds and the initial road laser point clouds; and the average road elevation is subtracted from elevations of all laser points in the single frame data to obtain single frame data after the migration processing. Since the single frame data after the migration processing not only includes the non-road laser point clouds after performing the migration processing on the initial non-road laser point clouds, but also includes the road laser point clouds after performing the migration processing on the initial road laser point clouds, the road laser point clouds after the migration processing may be removed from the single frame data after the migration processing, in this way, the non-road laser point clouds after performing the migration processing on the initial non-road laser point clouds may be obtained.

In another possible implementation, if the laser point clouds to be fused only include the initial non-road laser point clouds, but not include the initial road laser point clouds, then the non-road laser point clouds after the migration processing may not be obtained based on the average road elevation method. In this case, when performing the migration processing on the elevations of the initial non-road laser point clouds, a previous frame of single frame data having been migrated that is closest to single frame data in the laser point clouds to be fused and a subsequent frame of single frame data having been migrated that is closest to the single frame data in the laser point clouds to be fused may first be acquired; and interpolation processing is performed on the previous frame of single frame data and the subsequent frame of single frame data, in this way, the single frame data after the migration processing may be obtained. Similarly, since the single frame data after the migration processing not only includes the non-road laser point clouds after performing the migration processing on the initial non-road laser point clouds, but also includes the road laser point clouds after performing the migration processing on the initial road laser point clouds, the road laser point clouds after the migration processing may be removed from the single frame data after the migration processing, in this way, the non-road laser point clouds after performing the migration processing on the initial non-road laser point clouds may be obtained.

Exemplary, if the single frame data in the laser point clouds to be fused is a fourth frame of single frame data, and a third frame of single frame data is single frame data having been migrated, then the previous frame of single frame data having been migrated that is closest to the single frame data in the laser point clouds to be fused is the third frame of single frame data; if the third frame of single frame data is not the single frame data having been migrated, but a second frame of single frame data is single frame data having been migrated, then the previous frame of single frame data having been migrated that is closest to the single frame data in the laser point clouds to be fused is the second frame of single frame data. Similarly, if the single frame data in the laser point clouds to be fused is a fourth frame of single frame data, and a fifth frame of single frame data is single frame data having been migrated, then the subsequent frame of single frame data having been migrated that is closest to the single frame data in the laser point clouds to be fused is the fifth frame of single frame data; if the fifth frame of single frame data is not the single frame data having been migrated, but a sixth frame of single frame data is single frame data having been migrated, then the subsequent frame of single frame data having been migrated that is closest to the single frame data in the laser point clouds to be fused is the sixth frame of single frame data.

It can be seen that, in the embodiment of the present application, in the method of acquiring non-road laser point clouds, the screening processing may be first performed on the laser point clouds to be fused to obtain the initial non-road laser point clouds; and the migration processing is performed on the elevations of the initial non-road laser point clouds to obtain non-road laser point clouds. In this way, by performing the migration processing on the elevations of the initial non-road laser point clouds, when superimposing the non-road laser point clouds after the migration processing and the map to be fused subsequently, the non-road laser point clouds may be better matched with the map to be fused in height, so as to improve the precision of superposition.

Based on any of the above embodiments, after acquiring the laser point clouds to be fused, the dilution processing may be performed on the non-road laser point clouds in the laser point clouds to be fused. Exemplary, when performing the dilution processing on the non-road laser point clouds in the laser point clouds to be fused, a dilution ratio may be first determined, which may be set according to actual needs; after the dilution ratio is determined, a weighted octree segmentation is performed on the non-road laser point clouds according to the dilution ratio to obtain non-road laser point clouds corresponding to multiple leaf nodes; for each leaf node in the multiple leaf nodes, a center of gravity within a voxel of the non-road laser point cloud corresponding to the leaf node is calculated, and weighting is performed on an attribute value of the non-road laser point cloud corresponding to the leaf node to obtain an attribute value of the center of gravity, where the attribute value of the center of gravity is the target non-road laser point cloud corresponding to the leaf node. Based on this method, the target non-road laser point clouds corresponding to respective leaf nodes of the multiple leaf nodes may be obtained, and the target non-road laser point clouds corresponding to respective leaf nodes of the multiple leaf nodes are the target non-road laser point clouds obtained by performing the dilution processing on the non-road laser point clouds in the laser point clouds to be fused.

It can be seen that when performing the dilution processing on the non-road laser point clouds in the laser point clouds to be fused, the weighted octree segmentation is performed on the non-road laser point clouds according to the dilution ratio, and the center of gravity within the voxel of the non-road laser point cloud corresponding to the leaf node is calculated, the attribute value of the center of gravity is determined as the target non-road laser point cloud corresponding to the leaf node, so that the attribute value of the center of gravity represents the non-road laser point cloud corresponding to the entire leaf node, which effectively reduces the amount of data of the laser point clouds to be fused.

After performing the dilution processing on the non-road laser point clouds in the laser point clouds to be fused to obtain the target non-road laser point clouds, and performing the segmentation processing on the map to be fused to obtain the multi-level map data corresponding to the map to be fused, then, the superposition processing may be performed on the target non-road laser point clouds and the multi-level map data, and the superposition result is visualized, that is, the above S104 is executed. In order to facilitate the understanding of how to superimpose the target non-road laser point clouds and the multi-level map data in the above S104, in the following, how to performing the superposition processing on the target non-road laser point clouds and the multi-level map data is described in detail through the following embodiment 3 shown in FIG. 5.

Embodiment 3

Figure 5:
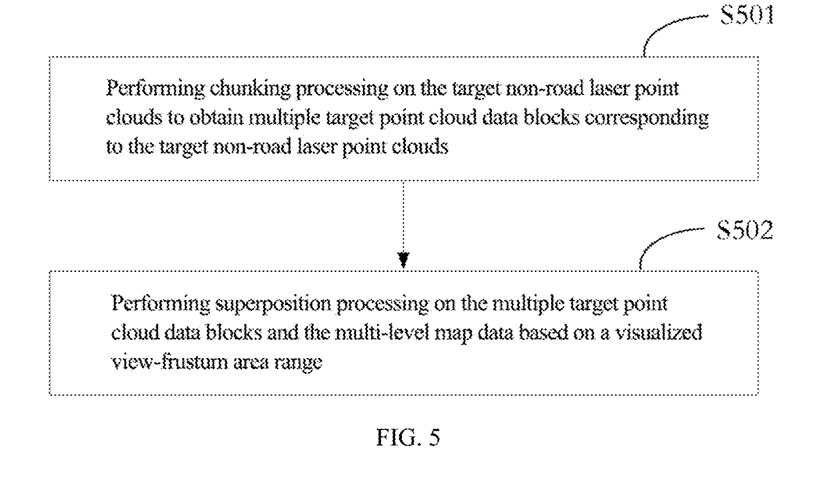
FIG. 5 is a schematic flowchart of a method for performing superimposing processing on target non-road laser point clouds and multi-level map data according to a third embodiment of the present application.

FIG. 5 is a schematic flowchart of a method for superimposing target non-road laser point clouds and multi-level map data according to a third embodiment of the present application, the method for superimposing the target non-road laser point clouds and the multi-level map data may also be executed by a software and/or hardware apparatus. For example, the hardware device can be a terminal or a server. Exemplary, please refer to FIG. 5, the method of superimposing the target non-road laser point clouds and the multi-level map data may include:

S501, performing chunking processing on the target non-road laser point clouds to obtain multiple target point cloud data blocks corresponding to the target non-road laser point clouds.

Exemplary, when performing the chunking processing on the target non-road laser point clouds, the target non-road laser point clouds may be chunked with a tile size of 64 m*64 m according to geographic spatial distributions of the target non-road laser point clouds to obtain the multiple target point cloud data blocks corresponding to the target non-road laser point clouds.

S502. performing superposition processing on the multiple target point cloud data blocks and the multi-level map data based on a visualized view-frustum area range.

Exemplary, when performing superposition processing on the multiple target point cloud data blocks and the multi-level map data based on the visualized view-frustum area range, point cloud data blocks and map data that meet a multi-level of detail segmentation rule are screened out from the multiple target point cloud data blocks and the multi-level map data based on the visualized view-frustum area range, that is, the point cloud data blocks and the map data that appear in the visualized view-frustum area range and meet the multi-level of detail segmentation rule are chosen from the multiple target point cloud data blocks and the multi-level map data, and then superposition processing is performed on the selected point cloud data blocks and the map data.

Among them, the visualized view-frustum area range may be understood as a display range of an electronic device screen used for visualization when visually displaying the superposition result.

It can be seen that when superimposing the target non-road laser point clouds and the multi-level map data, the chunking processing may be performed on the target non-road laser point clouds to obtain the multiple target point cloud data blocks corresponding to the target non-road laser point clouds; then the superposition processing is performed on the multiple target point cloud data blocks and the multi-level map data based on the visualized view-frustum area range. Since the multi-level map data is obtained by performing the multi-level detail segmentation on the map to be fused, in this way, when superimposing the laser point clouds and the high-precision map for visualization, both the non-road information may be visualized through the laser point clouds, and the road information may be visualized through the high-precision map, not only digital city visualization is realized, but also the amount of visualized data is effectively reduced, the efficiency of data processing is improved and the display effect of digital urbanization is improved.

Embodiment 4

Figure 6:
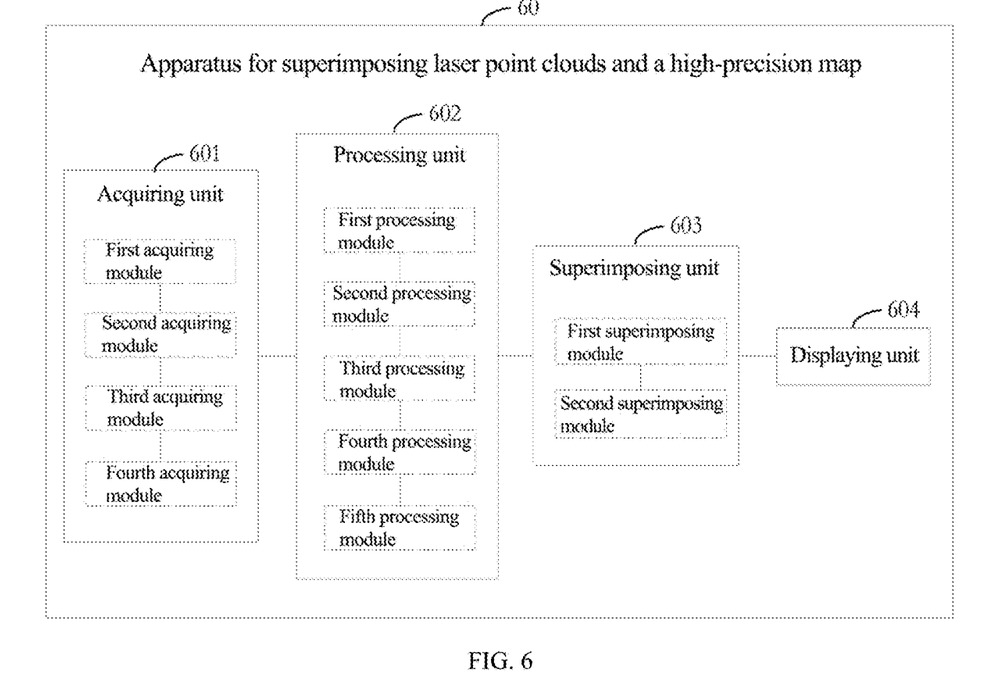
FIG. 6 is a schematic block diagram of an apparatus 60 for superimposing laser point clouds and a high-precision map according to a fourth embodiment of the present application.

FIG. 6 is a schematic block diagram of an apparatus 60 for superimposing laser point clouds and a high-precision map according to a fourth embodiment of the present application. Exemplary, please refer to FIG. 6, the apparatus 60 for superimposing the laser point clouds and the high-precision map may include:
- an acquiring unit 601, configured to acquire laser point clouds to be fused and a map to be fused respectively, where the map to be fused at least includes a partial high-precision map;
- a processing unit 602, configured to perform dilution processing on non-road laser point clouds in the laser point clouds to be fused to obtain target non-road laser point clouds, and perform segmentation processing on the map to be fused to obtain multi-level map data corresponding to the map to be fused;
- a superimposing unit 603, configured to perform superposition processing on the target non-road laser point clouds and the multi-level map data; and
- a displaying unit 604, configured to visualize a superposition result.

In an embodiment, the superimposing unit 603 includes a first superimposing module and a second superimposing module.

The first superimposing module is configured to perform chunking processing on the target non-road laser point clouds to obtain multiple target point cloud data blocks corresponding to the target non-road laser point clouds.

The second superimposing module is configured to perform superposition processing on the multiple target point cloud data blocks and the multi-level map data based on a visualized view-frustum area range.

In an embodiment, the second superimposing module includes a first superimposing sub-module and a second superimposing sub-module.

The first superimposing sub-module is configured to screen out point cloud data blocks and map data that meet a multi-level of detail segmentation rule from the multiple target point cloud data blocks and the multi-level map data respectively based on the visualized view-frustum area range.

The second superimposing sub-module is configured to perform superposition processing on the point cloud data blocks and the map data that meet the multi-level of detail segmentation rule.

In an embodiment, the processing unit 602 includes a first processing module, a second processing module, and a third processing module.

The first processing module is configured to determine a dilution ratio.

The second processing module is configured to perform a weighted octree segmentation on the non-road laser point clouds according to the dilution ratio to obtain a non-road laser point cloud corresponding to each of the multiple leaf nodes.

The third processing module is configured to calculate, for each leaf node, a center of gravity within a voxel of the non-road laser point cloud corresponding to the leaf node, and perform weighting on an attribute value of the non-road laser point cloud corresponding to the leaf node to obtain an attribute value of the center of gravity; where the attribute value of the center of gravity is the target non-road laser point cloud corresponding to the leaf node.

In an embodiment, the processing unit 602 further includes a fourth processing module and a fifth processing module.

The fourth processing module is configured to perform screening processing on the laser point clouds to be fused to obtain initial non-road laser point clouds.

The fifth processing module is configured to perform migration processing on elevations of the initial non-road laser point clouds to obtain the non-road laser point clouds.

In an embodiment, if the laser point clouds to be fused further include initial road laser point clouds, then the fifth processing module includes a first processing sub-module, a second processing sub-module, and a third processing sub-module.

The first processing sub-module is configured to determine an average road elevation corresponding to single frame data in the laser point clouds to be fused.

The second processing sub-module is configured to subtract the average road elevation from elevations of all laser points in the single frame data to obtain the single frame data after the migration processing; where the single frame data after the migration processing includes the road laser point clouds after performing the migration processing on the initial road laser point clouds.

The third processing sub-module is configured to remove the road laser point clouds after the migration processing from the single frame data after the migration processing to obtain the non-road laser point clouds.

In an embodiment, if the laser point clouds to be fused do not include the initial road laser point clouds, then the fifth processing module includes a fourth processing sub-module, a fifth processing sub-module, and a sixth processing sub-module.

The fourth processing sub-module is configured to determine a previous frame of single frame data having been migrated that is closest to single frame data in the laser point clouds to be fused and a subsequent frame of single frame data having been migrated that is closest to the single frame data in the laser point clouds to be fused.

The fifth processing sub-module is configured to perform interpolation processing on the previous frame of single frame data and the subsequent frame of single frame data to obtain the single frame data after the migration processing; where the single frame data after the migration processing includes the road laser point clouds after performing the migration processing on the initial road laser point clouds.

The sixth processing sub-module is configured to remove the road laser point clouds after the migration processing from the single frame data after the migration processing to obtain the non-road laser point clouds.

In an embodiment, the acquiring unit 601 includes a first acquiring module and a second acquiring module.

The first acquiring module is configured to acquire initial laser point clouds.

The second acquiring module is configured to perform optimizing processing on a precision of the initial laser point clouds to obtain the laser point clouds to be fused; where the precision of the laser point clouds to be fused is higher than that of the initial laser point clouds.

In an embodiment, if the map to be fused further includes a standard precision map, the acquiring unit 601 further includes a third acquiring module and a fourth acquiring module.

The third acquiring module is configured to perform optimizing processing on a precision of the standard precision map to obtain a processed map.

The fourth acquiring module is configured to perform fusion on the processed map and the high-precision map to obtain the map to be fused.

The apparatus 60 for superimposing the laser point clouds and the high-precision map according to the embodiment of the present application may execute the technical solution of the method for superimposing the laser point clouds and the high-precision map shown in any of the above embodiments, and its implementation principle and beneficial effect are similar to the implementation principle and beneficial effect of the method for superimposing the laser point clouds and the high-precision map, please refer to the implementation principle and beneficial effect of the method for superimposing the laser point clouds and the high-precision map, which will not be repeated here.

According to an embodiment of the present application, the present application also provides an electronic device and a readable storage medium.

According to an embodiment of the present application, the present application also provides a computer program product, the computer program product includes: a computer program, the computer program is stored in a readable storage medium, at least one processor of an electronic device can read the computer program from the readable storage medium, and the at least one processor executes the computer program to enable the electronic device to execute the solution provided in any of the foregoing embodiments.

Figure 7:
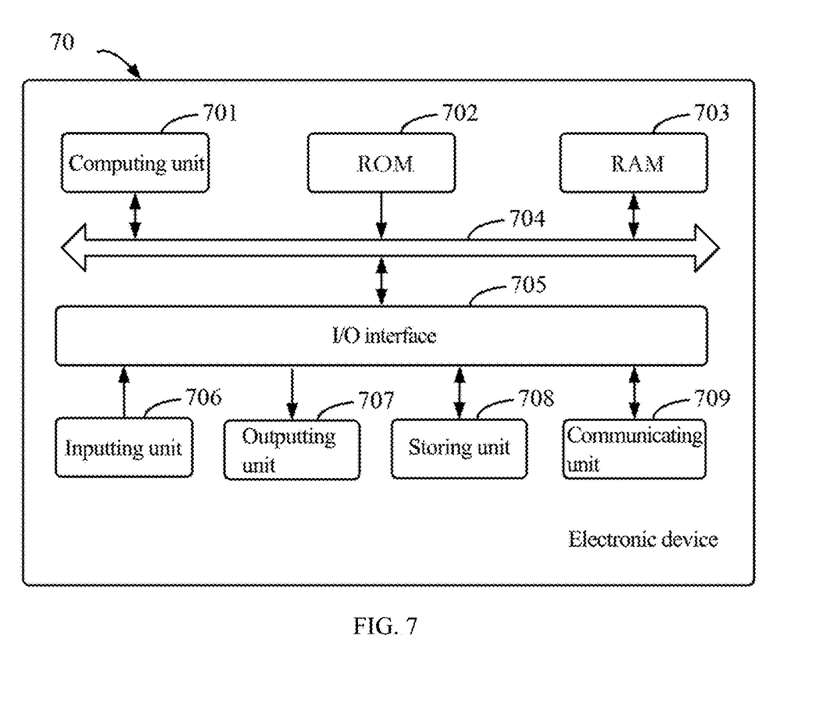
FIG. 7 is a schematic block diagram of an electronic device according to an embodiment of the present application.

FIG. 7 is a schematic block diagram of an electronic device 70 according to an embodiment of the present application. The electronic device is intended to represent various forms of digital computers, such as laptop computer, desktop computer, workstation, personal digital processing, server, blade server, mainframe computer, and other suitable computers. The electronic device may also represent various forms of mobile apparatuses, such as personal digital assistant, cellular phone, smart phone, wearable device and other similar computing apparatuses. The components shown herein, their connections and relationships, and their functions are merely examples, and are not intended to limit the implementations of the present disclosure described and/or claimed herein.

As shown in FIG. 7, the electronic device 70 includes a computing unit 701, which can perform various appropriate actions and processes according to computer programs stored in a read only memory (ROM) 702 or computer programs loaded from a storage unit 708 to a random access memory (RAM) 703. In the RAM 703, various programs and data required when the device operates may also be stored. The computing unit 701, the ROM 702, and the RAM 703 are connected to each other through a bus 704. An input/output (I/O) interface 705 is also connected to the bus 704.

Multiple components in the electronic device 70 are connected to the I/O interface 705, including: an inputting unit 706, for example a keyboard, a mouse, and the like; an outputting unit 707, for example various types of displays, speakers, and the like; a storing unit 708, for example a magnetic disk, an optical disk, and the like; and a communicating unit 709, for example a network card, a modem, a wireless communication transceiver, and the like. The communicating unit 709 allows the device 70 to exchange information/data with other devices through a computer network such as Internet and/or various telecommunication networks.

The computing unit 701 may be various general-purpose and/or dedicated processing components with processing and computing capabilities. Some examples of the computing unit 701 include, but are not limited to, central processing unit (CPU), graphics processing unit (GPU), various dedicated artificial intelligence (AI) computing chips, various computing units that run machine learning model algorithms, digital signal processing (DSP), and any appropriate processor, controller, microcontroller, and the like. The computing unit 701 executes various methods and processes described above, for example the method for superimposing laser point clouds and a high-precision map. For example, in some embodiments, the method for superimposing the laser point clouds and the high-precision map may be implemented as a computer software program, which is tangibly contained in a machine-readable medium, for example the storage unit 708. In some embodiments, part or all of the computer programs may be loaded and/or installed on the device 70 via the ROM 702 and/or the communication unit 709. When the computer programs are loaded to the RAM 703 and executed by the computing unit 701, one or more steps of the above-described method for superimposing the laser point clouds and the high-precision map may be executed. Alternatively, in other embodiments, the computing unit 701 may be configured to execute the method for superimposing the laser point clouds and the high-precision map through any other suitable means (for example, by means of firmware).

The various implementations of systems and technologies described above herein may be implemented in a digital electronic circuit system, an integrated circuit system, a field programmable gate arrays (FPGA), an application specific integrated circuits (ASIC), an application-specific standard product (ASSP), a system on chip (SOC), a load programmable logic device (CPLD), a computer hardware, a firmware, a software, and/or a combination thereof. These various implementations may include: being implemented in one or more computer programs, the one or more computer programs may be executed and/or interpreted on a programmable system including at least one programmable processor, the programmable processor may be a dedicated or general-purpose programmable processor that can receive data and instructions from a storage system, at least one input apparatus, and at least one output apparatus, and transmit the data and instructions to the storage system, the at least one input apparatus, and the at least one output apparatus.

Program codes used to implement the method of the present disclosure may be written by using any combination of one or more programming languages. These program codes may be provided to processors or controllers of general-purpose computers, dedicated computers, or other programmable data processing apparatuses, so that when the program codes are executed by the processors or controllers, functions/operations specified in the flowcharts and/or block diagrams are implemented. The program codes may be executed entirely on a machine, partially executed on the machine, or as an independent software package, partially executed on the machine and partially executed on a remote machine, or entirely executed on the remote machine or a server.

In the context of the present disclosure, a machine-readable medium may be a tangible medium, which may include or store programs for use by an instruction execution system, an apparatus, or a device or for use in combination with the instruction execution system, the apparatus, or the device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing contents. More specific examples of the machine-readable storage medium would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing contents.

To provide interaction with a user, the systems and technologies described herein can be implemented on a computer having: a display apparatus (e.g., a CRT (cathode ray tube) or LCD (liquid crystal display) monitor) for displaying information to the user; and a keyboard and pointing apparatus (e.g., a mouse or a trackball) through which the user can provide input to the computer. Other kinds of apparatuses may also be used to provide interaction with the user; for example, the feedback provided to the user may be any form of sensor feedback (for example, visual feedback, audible feedback, or haptic feedback); and input from the user may be received in any form, including acoustic input, voice input or haptic input.

The systems and technologies described herein can be implemented in a computing system (e.g., as a data server) including background components, or a computing system (e.g., an application server) including middleware components, or a computing system (e.g., a user computer with a graphical user interface or a web browser through which users can interact with implementation of the systems and technologies described herein) including front-end components, or a computing system including any combination of such back-end components, middleware components, or front-end components. The components of the systems can be interconnected by any form or medium of digital data communication (e.g., a communication network). Examples of the communication network include local area network (LAN), wide area network (WAN), and Internet.

The computer system may include a client side and a server. The client side and the server are generally remote from each other and typically interact through a communication network. The relationship between the client side and server is generated by computer programs running on a corresponding computer and having a client side-server relationship with each other. The server may be a cloud server, also be referred as a cloud computing server or a cloud host, which is a host product in a cloud computing service system to solve existing shortcomings of difficult management and weak business scalability in the traditional physical host and VPS service ("Virtual Private Server", or "VPS" for short). The server may also be a server of a distributed system, or a server combined with a block chain.

It should be understood that various forms of processes shown above can be used to reorder, add, or delete steps. For example, various steps recorded in the present application can be executed in parallel, sequentially or in different orders. As long as the desired results of the technical solutions disclosed in the present application can be achieved, there is no limitation herein.

The above-mentioned specific implementations do not constitute a limitation of the protection scope of the present application. It should be understood by those skilled in the art that various modifications, combinations, sub-combinations and substitutions may be made according to design requirements and other factors. Any modification, equivalent replacement, improvement and the like made within the spirit and principle of the present application shall be included within the protection scope of the present application.

What is claimed is:

1. A method for superimposing laser point clouds and a high-precision map, comprising:
    acquiring laser point clouds to be fused and a map to be fused respectively, wherein the map to be fused at least comprises a partial high-precision map;
    performing dilution processing on non-road laser point clouds in the laser point clouds to be fused to obtain target non-road laser point clouds;
    performing segmentation processing on the map to be fused to obtain multi-level map data corresponding to the map to be fused; and
    performing superposition processing on the target non-road laser point clouds and the multi-level map data, and visualizing a superposition result;
    wherein the performing dilution processing on non-road laser point clouds in the laser point clouds to be fused to obtain target non-road laser point clouds comprises:
    determining a dilution ratio;
    performing a weighted octree segmentation on the non-road laser point clouds according to the dilution ratio to obtain a non-road laser point cloud corresponding to each of multiple leaf nodes; and
    calculating, for each leaf node, a center of gravity within a voxel of the non-road laser point cloud corresponding to the leaf node, and weighting an attribute value of the non-road laser point cloud corresponding to the leaf node to obtain an attribute value of the center of gravity; wherein the attribute value of the center of gravity is target non-road laser point cloud corresponding to the leaf node.

2. The method according to claim 1, wherein the performing superposition processing on the target non-road laser point clouds and the multi-level map data comprises:

performing chunking processing on the target non-road laser point clouds to obtain multiple target point cloud data blocks corresponding to the target non-road laser point clouds; and performing superposition processing on the multiple target point cloud data blocks and the multi-level map data based on a visualized view-frustum area range.

3. The method according to claim 2, wherein the performing superposition processing on the multiple target point cloud data blocks and the multi-level map data based on a visualized view-frustum area range comprises:

screening out point cloud data blocks and map data that meet a multi-level of detail segmentation rule from the multiple target point cloud data blocks and the multi-level map data respectively based on the visualized view-frustum area range; and performing superposition processing on the point cloud data blocks and the map data that meet the multi-level of detail segmentation rule.

4. The method according to claim 1, wherein the method further comprises:

performing screening processing on the laser point clouds to be fused to obtain initial non-road laser point clouds; and performing migration processing on elevations of the initial non-road laser point clouds to obtain the non-road laser point clouds.

5. The method according to claim 4, wherein when the laser point clouds to be fused further comprises initial road laser point clouds, then the performing migration processing on elevations of the initial non-road laser point clouds to obtain the non-road laser point clouds comprises:

determining an average road elevation corresponding to single frame data in the laser point clouds to be fused;

subtracting the average road elevation from elevations of all laser points in the single frame of data to obtain single frame data after the migration processing; wherein the single frame data after the migration processing comprises road laser point clouds after performing the migration processing on the initial road laser point cloud; and removing the road laser point clouds after the migration processing from the single frame data after the migration processing to obtain the non-road laser point clouds.

6. The method according to claim 4, wherein when the laser point clouds to be fused do not comprise initial road laser point clouds, then the performing migration processing on elevations of the initial non-road laser point clouds to obtain the non-road laser point clouds comprises:

determining a previous frame of single frame data having been migrated that is closest to single frame data in the laser point clouds to be fused and a subsequent frame of single frame data having been migrated that is closest to the single frame data in the laser point clouds to be fused;

performing interpolation processing on the previous frame of single frame data and the subsequent frame of single frame data to obtain the single frame data after the migration processing; wherein, the single frame data after the migration processing comprises road laser point clouds after performing the migration processing on the initial road laser point cloud; and removing the road laser point clouds after the migration processing from the single frame data after the migration processing to obtain the non-road laser point clouds.

7. The method according to claim 1, wherein the acquiring laser point clouds to be fused comprises:

acquiring initial laser point clouds; and performing optimizing processing on precision of the initial laser point clouds to obtain the laser point clouds to be fused; wherein precision of the laser point clouds to be fused is higher than the precision of the initial laser point clouds.

8. The method according to claim 1, wherein when the map to be fused further comprises a standard precision map, the acquiring a map to be fused comprises:

performing optimizing processing on precision of the standard precision map to obtain a processed map; and performing fusion on the processed map and the high-precision map to obtain the map to be fused.

9. A non-transitory computer-readable storage medium storing computer instructions, wherein the computer instructions are used to cause a computer execute the method for superimposing the laser point clouds and the high-precision map according to claim 1.

10. An apparatus for superimposing laser point clouds and a high-precision map, comprising:

at least one processor; and a memory communicatively connected with the at least one processor; wherein, the memory stores instructions executable by the at least one processor, and the instructions are executed by the at least one processor, to enable the at least one processor to:

acquire laser point clouds to be fused and a map to be fused respectively, wherein the map to be fused at least comprises a partial high-precision map;

perform dilution processing on non-road laser point clouds in the laser point clouds to be fused to obtain target non-road laser point clouds, and perform segmentation processing on the map to be fused to obtain multi-level map data corresponding to the map to be fused;

perform superposition processing on the target non-road laser point clouds and the multi-level map data; and visualize a superposition result;

wherein the at least one processor is further enabled to:

determine a dilution ratio;

perform a weighted octree segmentation on the non-road laser point clouds according to the dilution ratio to obtain a non-road laser point cloud corresponding to each of the multiple leaf nodes; and calculate, for each leaf node, a center of gravity within a voxel of the non-road laser point cloud corresponding to the leaf node, and perform weighting on an attribute value of the non-road laser point cloud corresponding to the leaf node to obtain an attribute value of the center of gravity; wherein the attribute value of the center of gravity is target non-road laser point cloud corresponding to the leaf node.

11. The apparatus according to claim 10, wherein the at least one processor is further enabled to:

perform chunking processing on the target non-road laser point clouds to obtain multiple target point cloud data blocks corresponding to the target non-road laser point clouds; and perform superposition processing on the multiple target point cloud data blocks and the multi-level map data based on a visualized view-frustum area range.

12. The apparatus according to claim 11, wherein the at least one processor is further enabled to:

screen out point cloud data blocks and map data that meet a multi-level of detail segmentation rule from the multiple target point cloud data blocks and the multi-level map data respectively based on the visualized view-frustum area range;

perform superposition processing on the point cloud data blocks and the map data that meet the multi-level of detail segmentation rule.

13. The apparatus according to claim 10, wherein the at least one processor is further enabled to:

perform screening processing on the laser point clouds to be fused to obtain initial non-road laser point clouds; and perform migration processing on elevations of the initial non-road laser point clouds to obtain the non-road laser point clouds.

14. The apparatus according to claim 13, wherein when the laser point clouds to be fused further comprises initial road laser point clouds, then the at least one processor is further enabled to:

determine an average road elevation corresponding to single frame data in the laser point clouds to be fused;

subtract the average road elevation from elevations of all laser points in the single frame data to obtain the single frame data after the migration processing; wherein the single frame data after the migration processing comprises the road laser point clouds after performing the migration processing on the initial road laser point clouds; and remove the road laser point clouds after the migration processing from the single frame data after the migration processing to obtain the non-road laser point clouds.

15. The apparatus according to claim 13, wherein when the laser point clouds to be fused do not comprise initial road laser point clouds, then the at least one processor is further enabled to:

determine a previous frame of single frame data having been migrated that is closest to single frame data in the laser point clouds to be fused and a subsequent frame of single frame data having been migrated that is closest to the single frame data in the laser point clouds to be fused;

perform interpolation processing on the previous frame of single frame data and the subsequent frame of single frame data to obtain the single frame data after the migration processing; wherein, the single frame data after the migration processing comprises the road laser point clouds after performing the migration processing on the initial road laser point clouds; and remove the road laser point clouds after the migration processing from the single frame data after the migration processing to obtain the non-road laser point clouds.

16. The apparatus according to claim 10, wherein the at least one processor is further enabled to:

acquire initial laser point clouds; and perform optimizing processing on precision of the initial laser point clouds to obtain the laser point clouds to be fused; wherein the precision of the laser point clouds to be fused is higher than the precision of the initial laser point clouds.

17. The apparatus according to claim 10, wherein when the map to be fused further comprises a standard precision map, the at least one processor is further enabled to:

perform optimizing processing on precision of the standard precision map to obtain a processed map; and perform fusion on the processed map and the high-precision map to obtain the map to be fused.

* * * * *